(12) United States Patent
Herrington et al.

(10) Patent No.: US 6,736,966 B2
(45) Date of Patent: May 18, 2004

(54) PORTABLE WATER DISINFECTION SYSTEM

(75) Inventors: Rodney E. Herrington, Albuquerque, NM (US); Frank Hand, Albuquerque, NM (US)

(73) Assignee: MIOX Corporation, Albuquerque, NM (US)

( * ) Notice: Subject to any disclaimer, the term of this patent is extended or adjusted under 35 U.S.C. 154(b) by 0 days.

(21) Appl. No.: 09/907,092

(22) Filed: Jul. 16, 2001

(65) Prior Publication Data

US 2002/0020675 A1 Feb. 21, 2002

Related U.S. Application Data

(63) Continuation-in-part of application No. 09/318,468, filed on May 25, 1999, now Pat. No. 6,261,464, and a continuation-in-part of application No. 09/686,214, filed on Oct. 10, 2000, and a continuation-in-part of application No. 09/514,431, filed on Feb. 28, 2000, and a continuation-in-part of application No. PCT/US00/14513, filed on May 25, 2000, and a continuation-in-part of application No. 09/579,178, filed on May 24, 2000.

(60) Provisional application No. 60/266,659, filed on Feb. 5, 2001.

(51) Int. Cl.$^7$ ................................................. C02F 1/46
(52) U.S. Cl. ................. 210/192; 210/194; 210/244; 204/232; 204/271
(58) Field of Search ........................ 210/192, 194, 210/244; 204/232, 271

(56) References Cited

U.S. PATENT DOCUMENTS

| | | |
|---|---|---|
| 1,029,580 A | 6/1912 | Bane |
| 1,200,165 A | 10/1916 | Burgess |

(List continued on next page.)

OTHER PUBLICATIONS

Advertisement for "Steri–Pen" device marketed by Hydro–Photon, Inc. on web site located at www.hydro–photon.com
B.B. Gupta et al. "Permeate flux enhancement by pressure and flow pulsations in microfiltration with mineral membranes." Journal of Membrane Science, 70 (1002) 257–266.
L.V. Venczel et al. "Inactivation of Cryptosporidium parvum Oocysts and Clostridium perfringens Spored by a Mixed–Oxidant Disinfectant and by Free Chlorine." Applied and Environmental Microbiology, vol. 63, No. 4 (1997) 1598–1601.

*Primary Examiner*—Betsey Morrison Hoey
(74) *Attorney, Agent, or Firm*—Deborah A. Peacock; Katy C. Fain; Peacock, Myers & Adams, PC

(57) ABSTRACT

A portable oxidant generator for generating a chlorine or chlor-oxygen solution suitable for sterilizing contaminated drinking water, thereby providing a water disinfection system and potable water. The oxidant generator includes an electrolytic chamber and a power supply or source. The chamber holds a salt brine solution such that the solution is in contact with an anode and cathode included in the chamber. The power supply provides electrical charge that is passed between the anode and cathode through the salt brine solution. In the preferred embodiment of the present invention, a combination manual pump/switch is activated and injects electrolyte into the cell chamber and electrolyzes the solution. In one embodiment, as electrolysis proceeds, hydrogen gas is liberated and causes a gas pressure within the cell chamber thereby forcing the freshly generated oxidant solution from the cell. In another embodiment, as electrolysis proceeds, hydrogen gas is liberated and causes gas pressure within the sealed cell chamber which acts against a spring loaded piston thereby increasing the chamber volume to minimize pressure buildup, and to maintain the electrolyte in contact with the anode and cathode throughout the electrolysis process irrespective of the orientation of the device. When electrolysis is complete, an electric valve is actuated that allows the freshly produced oxidant to be discharged in to the drinking container to provide disinfection and render the water potable.

373 Claims, 6 Drawing Sheets

U.S. PATENT DOCUMENTS

| | | | |
|---|---|---|---|
| 2,473,986 A | 6/1949 | Booth | 210/185 |
| 3,222,269 A | 12/1965 | Stanton | 204/270 |
| 3,365,061 A | 1/1968 | Bray | 210/130 |
| 3,505,215 A | 4/1970 | Bray | 210/22 |
| 3,622,479 A | 11/1971 | Schneider | 204/149 |
| 3,654,148 A | 4/1972 | Bradley | 210/23 |
| 3,749,524 A | 7/1973 | Jordan | 417/323 |
| 3,791,768 A | 2/1974 | Wanner | 417/393 |
| 3,825,122 A | 7/1974 | Taylor | 210/134 |
| 4,000,065 A | 12/1976 | Ladha et al. | 210/23 H |
| 4,070,280 A | 1/1978 | Bray | 210/23 H |
| 4,077,883 A | 3/1978 | Bray | 210/136 |
| 4,124,488 A | 11/1978 | Wilson | 210/134 |
| 4,151,092 A | 4/1979 | Grimm et al. | 210/256 |
| 4,187,173 A | 2/1980 | Keefer | 210/23 H |
| 4,288,326 A | 9/1981 | Keefer | 210/637 |
| 4,290,873 A | 9/1981 | Weaver | 204/228 |
| 4,306,952 A | 12/1981 | Jansen | 204/149 |
| 4,321,137 A | 3/1982 | Kohler | 210/137 |
| 4,367,140 A | 1/1983 | Wilson | 210/110 |
| 4,389,311 A | 6/1983 | La Freniere | 210/198.1 |
| 4,432,876 A | 2/1984 | Keefer | 210/652 |
| 4,434,056 A | 2/1984 | Keefer | 210/637 |
| 4,496,443 A | 1/1985 | Mack et al. | 204/130 |
| 4,534,713 A | 8/1985 | Wanner | 417/377 |
| 4,560,455 A | 12/1985 | Porta et al. | 204/130 |
| RE32,144 E | 5/1986 | Keefer | 210/637 |
| 4,632,754 A | 12/1986 | Wood | 210/257.2 |
| 4,722,263 A | 2/1988 | Valentin | 92/13.7 |
| 4,724,079 A | 2/1988 | Sale et al. | 210/638 |
| 4,744,877 A | 5/1988 | Maddock | 204/266 |
| 4,756,830 A | 7/1988 | Fredkin | 210/321.66 |
| 4,759,844 A | 7/1988 | Lipschultz et al. | 210/257.2 |
| 4,761,208 A | 8/1988 | Gram et al. | 204/95 |
| 4,786,380 A | 11/1988 | Van Duin et al. | 204/95 |
| 4,790,923 A | 12/1988 | Stillman | 204/268 |
| 4,790,946 A | 12/1988 | Jansen | 210/748 |
| 4,836,924 A | 6/1989 | Solomon | 210/321.87 |
| RE33,135 E | 12/1989 | Wanner, Sr. et al. | 417/377 |
| 4,973,408 A | 11/1990 | Keefer | 210/652 |
| 4,976,842 A | 12/1990 | Fowler | 204/252 |
| 5,085,753 A | 2/1992 | Sherman | 204/267 |
| 5,207,916 A | 5/1993 | Goheen et al. | 210/637 |
| 5,244,579 A | 9/1993 | Horner et al. | 210/652 |
| 5,306,428 A | 4/1994 | Tonner | 210/652 |
| 5,320,718 A | 6/1994 | Molter et al. | 204/101 |
| 5,358,635 A | 10/1994 | Frank et al. | 210/90 |
| 5,480,386 A | 1/1996 | Brohy et al. | 604/131 |
| 5,492,534 A | 2/1996 | Athayde et al. | 604/141 |
| 5,496,466 A | 3/1996 | Gray | 210/137 |
| 5,503,736 A | 4/1996 | Schoenmeyr | 210/91 |
| 5,531,887 A | 7/1996 | Miers | 210/135 |
| 5,534,145 A | 7/1996 | Platter et al. | 210/90 |
| 5,540,848 A | 7/1996 | Engelhard | 210/748 |
| 5,558,762 A | 9/1996 | Fife et al. | 210/130 |
| 5,581,189 A | 12/1996 | Brenn | 324/439 |
| 5,597,482 A | 1/1997 | Melyon | 210/209 |
| 5,685,980 A | 11/1997 | Patapoff et al. | 210/244 |
| 5,725,758 A | 3/1998 | Chace et al. | 210/85 |
| 5,795,459 A | 8/1998 | Sweeney | 205/701 |
| 5,900,212 A | 5/1999 | Maiden et al. | 422/24 |
| 5,911,870 A * | 6/1999 | Hough | |
| 5,928,490 A | 7/1999 | Sweeney | 205/700 |
| 5,958,229 A | 9/1999 | Filiopoulos et al. | 210/206 |
| 5,989,396 A | 11/1999 | Prasnikar et al. | 204/290 |
| 6,007,686 A | 12/1999 | Welch et al. | 204/230.2 |
| 6,110,424 A | 8/2000 | Maiden et al. | 422/24 |
| 6,180,014 B1 * | 1/2001 | Salama | |

* cited by examiner

PORTABLE WATER DISINFECTION SYSTEM

CROSS-REFERENCE TO RELATED APPLICATIONS

This application is a continuation-in-part application and claims priority to U.S. patent application Ser. No. 09/318,468, issuing as U.S. Pat. No. 6,261,464, entitled "Portable Water Disinfection System", filed on May 25, 1999; continuation-in-part U.S. patent application Ser. No. 09/514,431, entitled "Portable Disinfection and Filtration System", filed on Feb. 28, 2000; continuation-in-part U.S. patent application Ser. No. 09/579,178, entitled "Portable Water Disinfection System", filed May 24, 2000; U.S. PCT/US00/14513, entitled "Portable Disinfection and Filtration System," filed May 25, 2000; U.S. patent application Ser. No. 09/686,214, entitled "Portable Hydration System," filed Oct. 10, 2000; and U.S. Provisional Patent Application Ser. No. 60/266,659, entitled "Mixed Oxidant Electrolytic Cell," filed Feb. 5, 2001. The specifications of each application listed are incorporated herein by reference.

GOVERNMENT RIGHTS

The U.S. Government has a paid-up license in this invention and the right in limited circumstances to require the patent owner to license others on reasonable terms as provided for by the terms of Contract No. DABT63-98-C-0052 awarded by U.S. Defense Advanced Research Projects Agency.

FIELD OF THE INVENTION

The present invention relates to water disinfecting systems, and more particularly, to a device for generating disinfecting solutions to be added to potentially contaminated water to render that water potable.

BACKGROUND OF THE INVENTION

Maintaining the sterility of drinking water supplies is a major factor in reducing the health risks to human populations. While large metropolitan water systems can make use of highly toxic chlorine gas for sterilizing drinking water, such systems are impractical in remote locations, which lack highly trained personnel and the equipment to maintain the systems. There are many settings in which sophisticated systems are not practical. For example, campers or military personnel in the field cannot be expected to operate such a system to provide potable drinking water from streams or other potentially contaminated water sources. To be effective in such rural settings, a system must be capable of running for long periods of time with little or no maintenance. In addition, the raw materials required by the system must be readily available.

Systems based on the electrolytic production of chlorine and/or other chlor-oxygen species based germicidal agents are particularly attractive for use in the present invention. These systems require only electricity and common salt as raw materials. One such system is described in U.S. Pat. No. 4,761,208 to Gram, et al. entitled "Electrolytic Method and Cell for Sterilizing Water," which is incorporated herein by reference.

Studies have been conducted to demonstrate microorganism inactivation effectiveness of a mixed-oxidant solution. Linda V. Venczel, Michael Arrowood, Margaret Hurd, and Mark D. Sobsey with the University of North Carolina at Chapel Hill, N.C. have conducted research and published a paper entitled, "Inactivation of *Cryptosporidium parvum* Oocysts and *Clostridium perfringens* Spores by a Mixed-Oxidant Disinfectant and by Free Chlorine," published in *Applied and Environmental Microbiology*, April 1997, p. 1598–1601.

The systems based on mixed-oxidant production have been used successfully in rural communities with small water supplies to larger municipal water systems treating millions of gallons per day. These larger systems are not well suited for use for point of use applications in homes, by individual campers and personnel in the field who must treat small quantities of water on a daily basis. The mixed oxidant systems designed to date are applicable to large quantities of water and are large and heavy. In addition, these systems require quantities of electrical power that are not practical at the mesoscale, or individual person level.

SUMMARY OF THE INVENTION

The present invention is an apparatus and method for generating an oxidant for decontamination of fluids. Several embodiments are described herein, one for a disposable generator and one for a refillable generator. The present invention decontaminates a fluid in a fluid container. This apparatus comprises an electrolytic cell for generating at least one oxidant (the oxidant to be subsequently added to the fluid), an electrolyte reservoir comprising an electrolyte disposed therein, a power source, an activator for activating the power source to generate a current and thereby generate an oxidant from the electrolyte, and an opening for release of at least a portion of the generated oxidant into the fluid.

The electrolytic cell comprises an anode and a cathode. The anode preferably comprises a titanium substrate and an oxide coating. The oxide coating preferably comprises a metal selected from the group VIII elements of the Periodic Table of the Elements. The cathode and anode may be concentric, plates, multiple plates, or other arrangement.

The activator preferably comprises a pump-like device, e.g. a mound, button or raised portion, that the user presses with his/her finger or hand. The power source preferably comprises a battery, although other sources such as an external power source, fuel cell, solar panel, and manually driven electric generator may be utilized in accordance with the present invention. The power source may comprise a generator to convert mechanical energy to electrical energy. A contact activates a switch to activate the power source. The apparatus preferably further comprises a timer set at a predetermined time to allow a predetermined current in the electrolytic cell. There may be fixed electrolyte conductivity. The apparatus preferably has a printed circuit board and microchip.

The electrolyte reservoir preferably comprises a salt reservoir. This reservoir may be a brine reservoir. The reservoir may be refillable, in which case there is an access port and preferably a filter screen. The electrolyte reservoir may further comprise a storage compartment. The storage compartment may comprise a self-sealing check valve, such as an elastomer or a mechanical check valve.

The apparatus may further comprise an indicator to let the user know when the oxidant has been generated and is ready to be discharged into the fluid, the electrolyte needs filling, etc. This indicator can be a visually readable indicator, audible indicator or vibratory indicator.

The generator is preferably attached to the fluid container (such as a portable water container). This attachment is preferably threads (e.g. a cap on a bottle) for attaching the apparatus to the fluid container, although other attachment means may be employed.

The apparatus comprises an opening for release of the oxidant into the fluid container. In the disposable embodiment, this opening comprises a check valve. In the refillable embodiment, a piston is used to release the oxidant into the fluid. Preferably, a predetermined amount of oxidant is released into the fluid.

The electrolyte reservoir, in the disposable embodiment, comprises an extension, wherein the electrolytic reaction takes place. This extension is disposed between the anode and cathode.

The oxidant generating reaction produces a gas pressure within the reservoir. Therefore, the apparatus comprises at least one opening for release of the gas pressure. The gas pressure provides for release of the oxidant through the opening into the fluid. The opening can be a vent. In the refillable embodiment, the piston moves with the gas pressure to help release the pressure.

The oxidant preferably comprises a chlorine containing substance. This chlorine-containing substance preferably comprises chlorine, hypochlorite, or chlor-oxygen substance.

In the refillable embodiment, comprising a piston, the piston draws the electrolyte into the electrolytic cell. The piston also moves in response to gas pressure generated with the cell. Further, the piston discharges the generated oxidant into the fluid. A stop button is useful for stopping movement of the piston.

The apparatus may further comprise a valve for sealing the cell during electrolysis. This valve is preferably an electrically activated valve.

In operation, the user presses the activator or button, electrolyte is subjected to a current between the anode and cathode generating at least one oxidant, and the oxidant is discharged into the fluid. The unit can be a one-time use or multiple use disposable cap or cell, or, it can be made to be refillable with electrolyte.

Broadly, it is an object of the present invention to provide a low cost and improved oxidant generator.

It is another object of the present invention to provide an improved batch mode oxidant generator.

It is a further object of the present invention to provide an oxidant generator that may be carried or fit onto a container that can be used by single person and utilized to sterilize small quantities of drinking water for individuals or small groups of people.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention is a portable oxidant generator for generating a solution suitable for sterilizing contaminated drinking water, thereby providing potable water. The oxidant generator includes an electrolyte storage container, a manual pump, an electrolytic chamber or cell, an oxidant discharge valve mechanism, a power source and/or supply, an electrical timer/circuit and a switch circuit.

The system can be housed in or integral to a cap (e.g. for a drinking bottle), can be integral to a liquid storage container, or can be part of a system for disinfection, sterilization, treatment or storage of water. The manual pump is hydraulically connected to an electrolyte brine storage container. Activation of the pump causes electrolyte to flow into the electrolytic cell that is enclosed on the inlet and outlet with a check valve and/or electrically operated valve. The cell holds a brine or electrolyte solution such that the solution is in contact with an anode and cathode included in the cell chamber. The power supply causes an electrical charge to pass between the anode and cathode through the salt brine solution. The brine is converted electrolytically to oxidants that are then added to the fluid to be treated rendering the fluid safe to drink.

Figure 1:
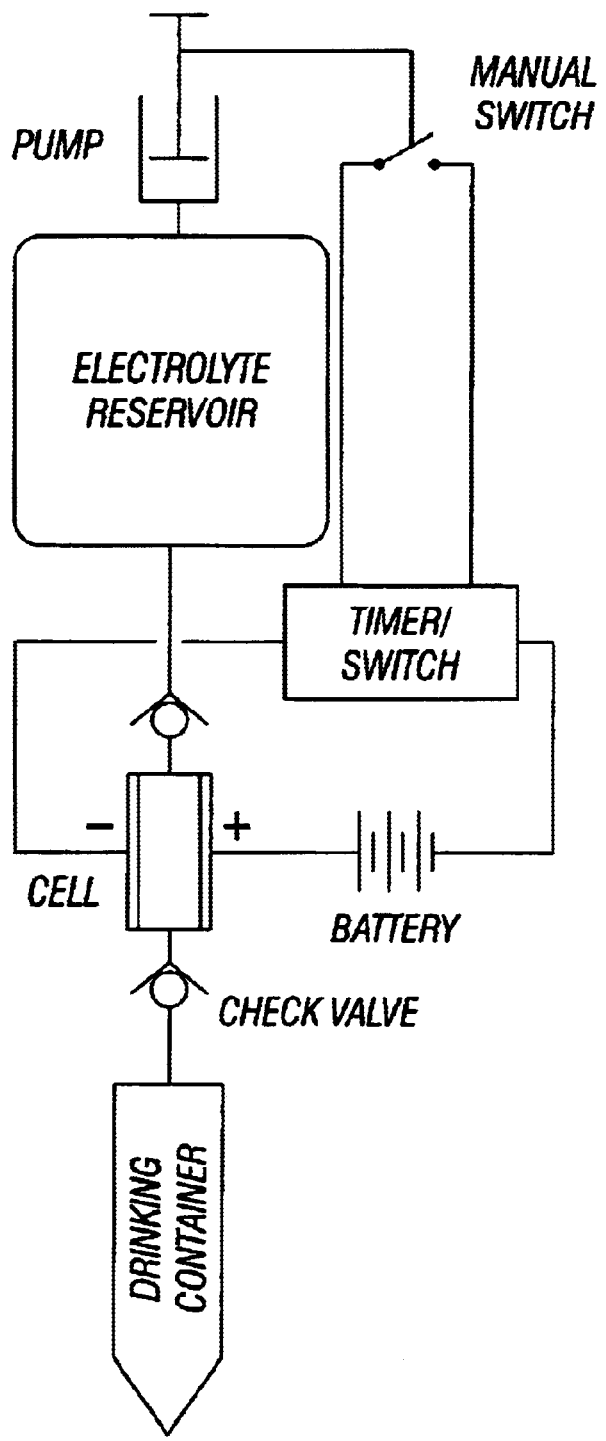
FIG. 1 is a schematic view of a preferred disposable oxidant generator of the present invention.
Figure 2:
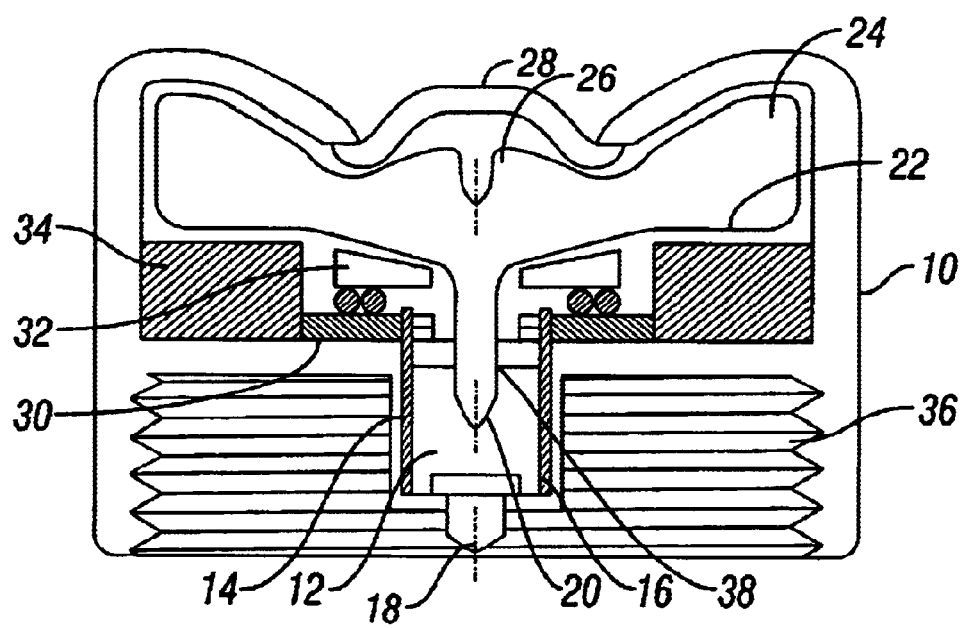
FIG. 2 is a cross-sectional view of the preferred embodiment of FIG. 1.
Figure 3:
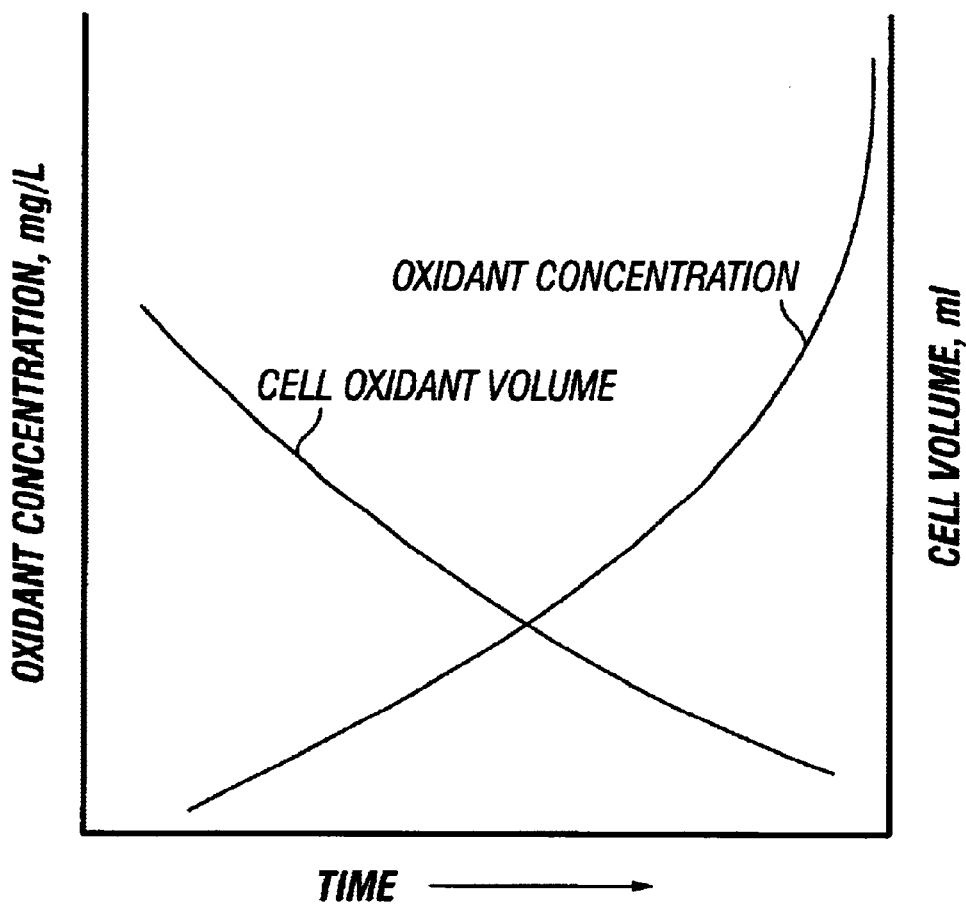
FIG. 3 is a chart showing the relationship between oxidant volume and concentration in the cell of the FIG. 1 embodiment.

In the preferred embodiment of the present invention, the power supply comprises a battery that is activated by a switch that is concurrently operated with the manual electrolyte pump. Upon switch activation, an electrical circuit (e.g. a timer and latching relay circuit) allows a prescribed amount of energy from the energy supply source to be applied to the anode and cathode in the electrolytic cell. As hydrogen is generated in the electrolysis process within the cell, gas pressure builds. In one embodiment; liquid oxidant is forced from the electrolytic cell through the cell discharge check valve and into the liquid container to be disinfected. In an alternative embodiment, as hydrogen is generated in the electrolysis process within the cell, gas pressure builds and causes a piston mechanism to open against spring pressure to reduce the ultimate pressure that would be generated if the cell chamber were otherwise constrained. FIGS. 1–3 show a disposable oxidant generator, whereas FIGS. 4–8 show a refillable oxidant generator.

The system of the present invention utilizes an electrolytic cell to generate an oxidant solution including chlorine in the form of hypochlorous acid and other chlor-oxygen species. Other embodiments of the present invention produce an oxidant solution that is predominantly sodium hypochlorite. The oxidant solution is preferably produced from a brine solution using common salt. This oxidant solution may be added directly to the drinking water at a dilution ratio compatible with the concentration of the oxidant produced in the device and the demand of the water. The oxidant produced is more effective at inactivation of microorganisms than is conventional chlorination technology, including chlorine gas, sodium hypochlorite, and calcium hypochlorite. At adequate dilution ratios, the water is sterilized without causing the water to become unpalatable. This technology is particularly attractive because of its simplicity and low production cost, disinfection effectiveness and safety.

The present invention is a portable, batch mode, oxidant generator that generates an aliquot of oxidant solution that can be added to water or other fluid in a storage container to provide potable or drinking water or fluid. The invention requires only that the user press the pump device or pump/switch combination to generate disinfectant that is subsequently transferred from the electrolytic cell to the drinking water storage container by the action of an electrically operated valve and the gas and/or spring pressure. In the preferred embodiment of the invention, a quantity of electrolyte and battery sufficient for at least several days of use is included in the apparatus of the present invention.

The present invention is based on the electrical chemical reactions that take place when a current is passed through a salt solution between an anode and cathode located in the solution. The manner in which the present invention operates may be more easily understood with reference to the Figures.

FIG. 1 is a schematic view of the preferred disposable oxidant generator of the present invention. FIG. 2 is a cross-sectional view of the generator. Referring to those Figures, electrolyte 24 is housed in electrolyte storage container 22. By pressing on pump button 28, electrolyte 24 is injected into cell chamber 12 via check valve 20 which is integral to electrolyte storage compartment 24.

In the preferred embodiment, shown in FIGS. 1 and 2, electrolyte housing 22 comprises check valve 20 which is incorporated in tubular extension of electrolyte storage compartment 24. Tubular extension is sealed with housing 10 at interface 38. Spring characteristics are built into plastic electrolyte storage housing 22. To allow venting of electrolyte storage compartment 22 as electrolyte is expelled through check valve 20, air is vented into electrolyte storage compartment via check valve 26.

Simultaneous with activation of pump button 28, contact disc 32 activates switch on circuit board 30. Electrolyte solution that is injected into cell compartment 12 is subjected to electrolytic decomposition by passing a current from power source 34 through circuit 30 and between anode 16 and cathode 14. The chemical species generated, in general, depends on the material from which anode 16 is constructed, as well as the electrochemical potential across anode 16 and cathode 14.

Microbiological inactivation studies were conducted and have demonstrated that a minimum electrical potential is required to ensure inactivation of chlorine resistant microorganisms such as *Cryptosporidium parvum*. The output characteristics of battery 34 are specifically designed to ensure delivery of the appropriate power to provide inactivation of resistant microorganisms. With appropriate electrical output characteristics of battery 34, electrical circuit 30 is not required to condition power delivery to the anode 16 and cathode 14, and subsequently, electrical circuit 30 is simple in function and low cost in production.

The quantity of oxidant generated depends primarily on the quantity of current that passes through the salt solution for a wide range of salt solution concentrations. The present invention utilizes this observation to simplify the control of the quantity of oxidant generated. By providing a fixed conductivity of electrolyte in electrolyte storage container 24, the quantity of oxidants produced is strictly controlled by a timer on a control circuit 30. For the purposes of the explanation of the present invention, it is sufficient to observe that electrical switch on circuit 30 is closed and a latching relay is activated, and remains activated until a timer opens the switch/relay. The period of time that the circuit is closed allows a predetermined amount of charge to flow between anode 16 and cathode 14. As charge is passed between the electrodes, oxidant solution is generated in cell housing 12 and is expelled from the cell through check valve 18 via hydrogen gas pressure generated within the cell chamber 12 from the electrolysis process. As the oxidant is discharged from cell chamber 12 into the water container during production of oxidant, the solution is then added directly to a predetermined amount of drinking water, such as the water in a plastic bottle, and which provides a prescribed oxidant dose to the water.

To further elucidate, the reactions that occur in cell chamber 12 are variable due to gas generation during electrolysis that causes discharge of electrolyte and oxidant from cell chamber 12 that results in less conductivity due to less electrolyte in cell chamber 12 over time. Referring to FIG. 3, as cell liquid volume decreases, cell conductivity decreases, but oxidant concentration increases as a result of lower unit volume over time. The net mass of oxidants that is discharged to the treated water container is the integrated value of the volume and concentration of oxidants that leaves cell chamber 12 during the interval that the timer circuit is active. Further, hydrogen gas generation volume is liberated at a faster rate than is required to discharge electrolyte from cell chamber 12. The well known gas equation, $PV=nRT$ applies, where P is pressure, V is volume of gas, T is temperature, n is the moles of gas, and R is the gas constant. In order to control discharge of oxidant from cell chamber 12, the discharge pressure of the cell needs to be controlled by the backpressure inherent in the design of cell discharge check valve 18. By allowing higher pressure in cell chamber 12, gas volume is reduced, thereby reducing the rate and volume of oxidant discharge from cell chamber 12.

The entire apparatus is designed for low cost construction with maximum use of injection molded components. The complete apparatus is housed within housing 10. The complete apparatus can incorporate threads 36, or the apparatus can be molded or spin welded directly into the water-bearing container. Possible assembly techniques include ultrasonic welding, spin welding, or other techniques commonly known to those familiar with high volume production techniques.

At the beginning of the electrolysis process, the contents of cell chamber consists mostly of un-electrolyzed electrolyte (dilute salt solution) and a small relative portion of oxidants. Toward the end of the cycle, the contents of the cell contain a large percentage of oxidants as compared to a very small percentage of unconverted electrolyte. Due to the inherent inefficiencies in the oxidant conversion process, total dissolved solids (TDS) in the form of salt water (electrolyte) are added to the drinking water container. Since all drinking water has TDS levels to varying degrees, the additional TDS contribution is not an adverse consequence, as long as the taste threshold of salt, approximately 500 milligrams per liter (mg/L), is not exceeded. By virtue of the design and volume of the cell, the approximate TDS addition is preferably less than 50 mg/L.

The preferred anode materials are a titanium, carbon-diamond, or other substrate with an oxide coating of Group VIII metals such as platinum, iridium, rhodium, or ruthenium, although other typical anode coating materials may be utilized in accordance with the present invention. In addition to being highly reactive catalytic compounds which produce products with good germicidal properties, these are highly resistant to corrosion and do not dissolve easily.

Figure 4:
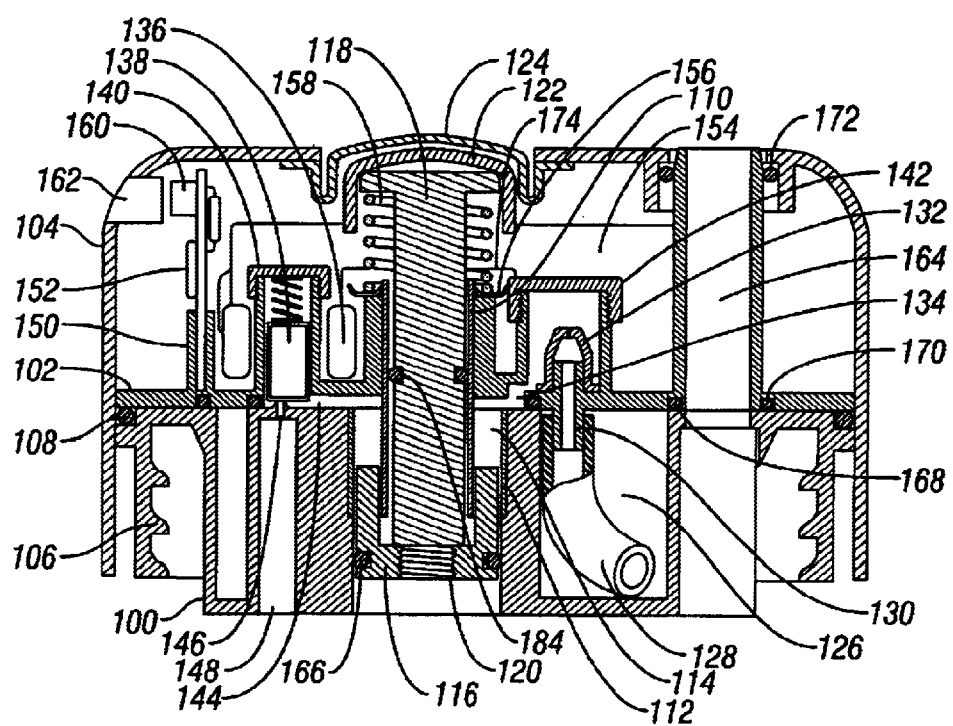
FIG. 4 is a cross-sectional view of alternative oxidant generator of the present invention.
Figure 5:
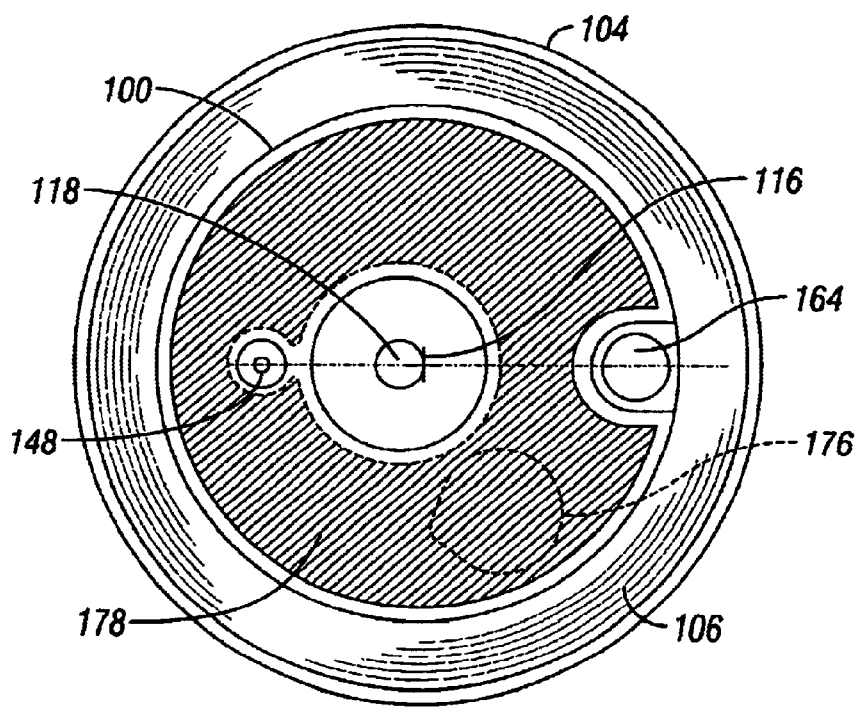
FIG. 5 is a bottom view of the FIG. 4 embodiment.
Figure 6:
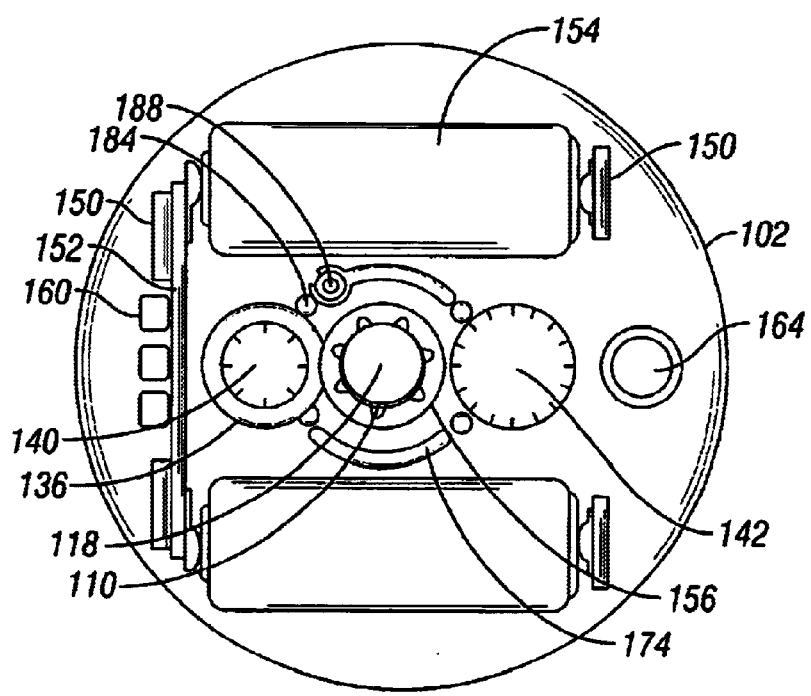
FIG. 6 is a top view of the FIG. 4 embodiment with the top cover removed.

An alternative embodiment of the present invention is shown in FIGS. 4–8. As shown therein, FIG. 4 is a cross-sectional view of the oxidant generator. Referring to FIG. 1, electrolyte is housed in electrolyte storage container 126. By pressing on pump button 122 through elastomeric membrane 124, action is transferred through pump shaft 118 and acts on piston 116. As piston 116 moves downward, a vacuum is created in cell chamber 114 which draws electrolyte from electrolyte storage container 126 through pickup tube 128 via nozzle 130 through elastomeric check valve 132 through passage 134 and into cell chamber 114. The volume of electrolyte that enters cell chamber 114 is initially limited by button stop 174 when pump button 122 comes in contact with button stop 174. Referring to FIG. 6, as button 122 comes in contact with button stop 174, it simultaneously comes in contact with electrical switch 188 that activates circuit 152 mounted on printed circuit board.

With further reference to FIG. 4, cell chamber 114 comprises cylindrical anode 112 and cylindrical cathode 110. The cell chamber is sealed by piston seal and pump shaft seal 184. The discharge port of cell chamber 114 comprises an electrically operated valve comprising a spring-loaded plastic coated solenoid body 138 and electrical coil 136. Plastic coated solenoid body 138 seals orifice port 146 while electrolysis of electrolyte is occurring in cell chamber 114. It will be obvious to those versed in the art or electrically operated valve design that any number of different types of valves can be utilized as an alternate to solenoid valve 138.

One of the advantages of the sealed cell chamber design is that the electrolyte is contained within the cell chamber 114 at all times during the electrolysis operation, irrespective of orientation of the cell chamber 114. This feature is desirable for military personnel in that they do not have to maintain a favorable orientation of the device after activation when the electrolyte is undergoing electrolysis. This feature, along with one-button activation, allows a military soldier to "treat and run" without concern for the orientation of the device.

Electrolyte solution that is injected into cell chamber 114 is subjected to electrolytic decomposition by passing a current from power source 154 through circuit 152 and between anode 112 and cathode 110. The chemical species generated, in general, depends on the material from which anode 112 is constructed, as well as the electrochemical potential across anode 112 and cathode 110.

Microbiological inactivation studies were conducted and have demonstrated that a minimum electrical potential is required to ensure inactivation of chlorine resistant microorganisms such as *Cryptosporidium pervum*. The output characteristics of batteries 154 and circuit 152 are specifically designed to ensure delivery of the appropriate power to provide inactivation of resistant microorganisms.

The quantity of oxidant generated in cell chamber 114 depends primarily on the quantity of electrical current that passes through the electrolyte solution for a wide range of salt solution concentrations. The present invention utilizes a power measurement circuit located on circuit 152 that utilizes this observation to control of the quantity of oxidant generated. During electrolysis, hydrogen gas is generated within cell chamber 114. As hydrogen gas is liberated, the pressure in cell chamber 114 increases. In order to avoid excessive pressure and allow the hydrogen gas room for expansion, piston 116 moves further down the piston bore with load increasing against spring 158. Pump shaft 118 is free to move within pump button 122 past the position of button stop 174. Pump button stop 174 limits the travel that the operator can push the pump shaft 118. By limiting the depth that the operator can push the pump shaft 118, piston 116 has additional depth that it can travel, thereby allowing space for hydrogen gas accumulation thereby limiting excessive pressure buildup in cell chamber 114.

After the prescribed amount of electrical current has been applied to the electrolyte and converted the electrolyte to oxidants of the proper concentration, the electrical circuit 152 terminates power to the electrolytic cell and applies power to electrical solenoid coil 136 thereby lifting plastic coated solenoid body 138 off of orifice seat 146. As plastic coated solenoid body 138 is lifted off of orifice seat 146, oxidant generated within cell chamber 114 is discharged through passage 144. Spring 158, that was previously loaded by the operator pressing pump button 122 and gas pressure liberated in the electrolysis process, provides the force to lift piston upward. With orifice 146 open, piston 116 moves upward closing off all volume in cell chamber 114 and expelling all oxidants through oxidant passage 148 and in to the drinking container. As the oxidant is discharged into the water container, the solution is then added directly to a predetermined amount of drinking water, such as the water in a plastic bottle or hydration bag, and which provides a prescribed oxidant dose to the water. After the appropriate time, electrical power is removed from solenoid coil 136 allowing spring-loaded plastic coated solenoid body 138 to close off orifice seat 146. This action resets the device to the starting point for the next treatment application. Circuit 152 comprises a microchip that provides programmable features to control all electrical operations of the device. By measuring and controlling the amount of power that enters the electrolyte, the final total mass of oxidants can be determined. A simple matter of changing the software values produces different masses of oxidants. This provides flexibility to the invention so that it can be properly configured to adequately treat different container sizes of fluids.

Figure 8:
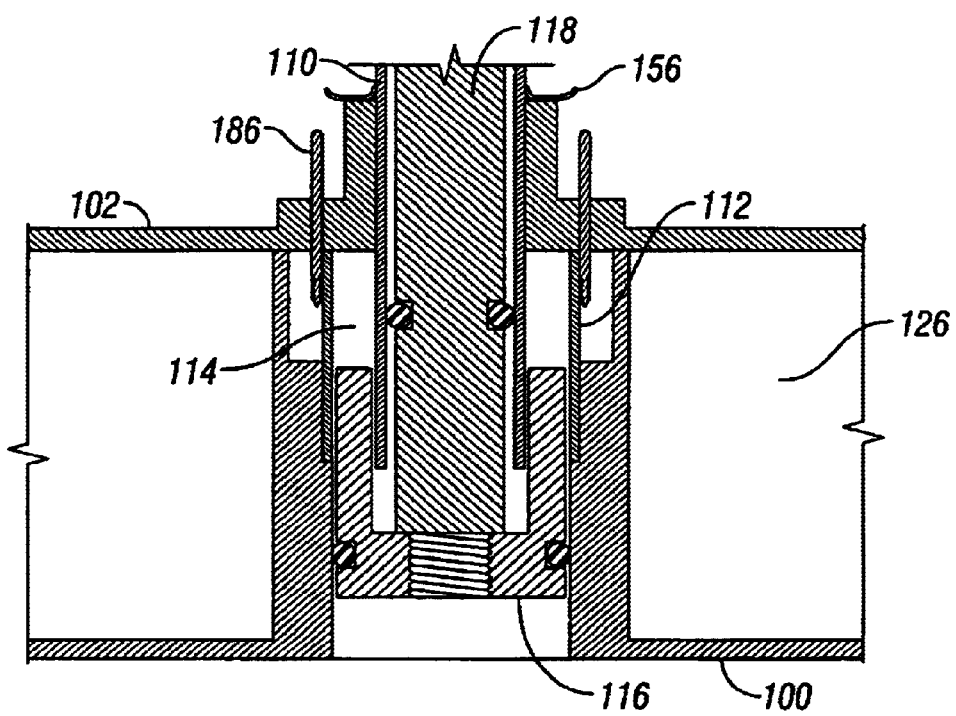
FIG. 8 is a detail of the electrical connections of the FIG. 4 embodiment.

Referring to FIG. 6, electrical power is provided by batteries 154 that are in contact with circuit 152. Circuit 152 is held in place within the device by circuit board supports 150 which are integrally molded into base assembly 102. Referring to FIG. 8, electrical power is transmitted to anode 112 by virtue of conductor pens 184 that are molded into base assembly 102. When base assembly 102 is assembled together with electrolyte housing 100, pens 184 make physical contact with the exterior surface of anode 112. During assembly, cathode 110 is assembled into base assembly 102 and restrained in position by retaining ring 156 which also serves to provide electrical contact with anode 102. Electrical wiring is routed from retaining ring 156 and conductor pens 184 to circuit 152 thereby providing electrical power to cell chamber 114. Referring again to FIG. 6, power to circuit 152, is activated by switch 188 when pump button 122 (see FIG. 4) comes in contact with switch 188. With reference to FIG. 4, control circuit 152 provides other functions including indication to the operator that the device is operating properly, or provides warning to the operator in the event that the device fails to operate properly. For instance, the device may be configured to warn the operator that the electrolyte chamber 126 is out of electrolyte, or that the batteries 154 are out of power. This indication can be provided by light emitting diodes 160 mounted on circuit 152. To provide light access to the outside of the device, cover housing 104 comprises translucent light window 162.

Figure 7:
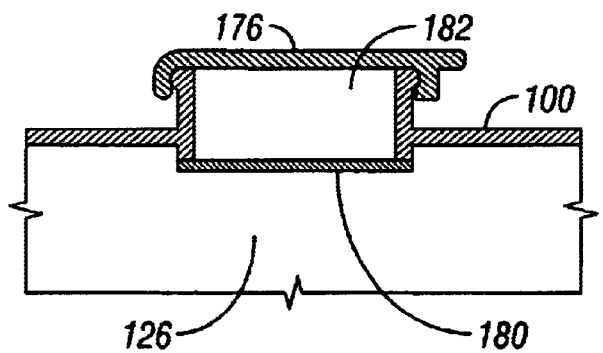
FIG. 7 is a detail of the salt fill compartment of the FIG. 4 embodiment.

The operational life of the device is determined by the amount of electrolyte stored in electrolyte housing 126 and the energy stored in batteries 154. By replacing batteries 154 and electrolyte the useful life of the device can be extended indefinitely. Access to batteries 154 is achieved by removal of cover assembly 104 from base assembly 102 which are sealed from the environment by o-ring seal 108 and drinking nozzle o-ring seal 172. Replenishment of electrolyte is achieved by adding the appropriate ratios of water and sodium chloride salt to the electrolyte chamber 126. Referring to FIG. 5, the area of the electrolyte chamber 126 is defined by the shaded area which comprises the interstitial spaces between the various penetrations that are required through the device, for instance, the piston chamber defined by piston 116, drinking water port 164 and oxidant vent port 148. Access to electrolyte chamber 126 is achieved by removing electrolyte chamber access cover 176. The proper concentration of electrolyte is obtained by mixing the correct volume of water with the correct amount of salt. Referring to FIG. 7, access cover 176 is removed revealing access to salt chamber 182. To refill the electrolyte container to the correct concentration of electrolyte, water is introduced into the electrolyte chamber 126 through the fill port created by removal of access cover 176. The bottom of salt chamber 182 comprises a filter screen 180 that readily passes water, but keeps granular salt from entering the electrolyte chamber 126. Salt is then introduced into salt chamber 182 until it is level full to the top of the salt chamber 182. Access cover 176 is then replaced on electrolyte housing 100. By design, the volume of water in electrolyte chamber 126 and salt chamber 182 provides the correct concentration of electrolyte when all of the salt has been dissolved. Salt dissolution occurs through filter screen 180 providing the correct concentration of electrolyte. By providing the correct concentration of the electrolyte, the charge integrating control circuit 152 will be more efficient in production of oxidant. For instance, when the electrolyte concentration is high, control circuit 152 draws more electrical current due to the higher conductivity of the electrolyte. This higher current draw reduces the voltage available from the batteries 154. The control circuit monitors the voltage available to convert the electrolyte to oxidant. Below a certain threshold voltage, enhanced oxidant performance regarding microorganism inactivation does not occur. If the voltage becomes too low, the control circuit 152 terminates operation and alarms the operator via light emitting diodes 160. By utilizing a narrow range of electrolyte concentration within the electrolyte chamber 126, more oxidant charges are produced from the batteries 154 than if the electrolyte were at a high concentration, thereby extending the operational life of the invention.

Access to the contents of the drinking container are achieved by discharging the fluid through drinking tube 164. It is obvious to those versed in the art that the drinking tube may comprise a check valve, rotational valve, or other valve mechanism to seal the drinking container until access to the fluid is required.

The entire apparatus is designed for low cost construction with maximum use of injection molded components, although cell or other parts may be made of plastic, metal, ceramic, silicone, or non-conducting materials. The major components of the apparatus include electrolyte housing 100, base assembly 102, and cover assembly 104. In the preferred embodiment electrolyte housing 100 and base assembly 102 are screwed together with o-ring seals 168 and 170 to provide a hermetic seal to the electrolyte chamber 126 and cell chamber 114. One advantage of the preferred embodiment is the ability to disassemble the device for cleaning. For instance, check valve cover 142 can be removed by hand to access cleaning, removal, or replacement of check valve 132 and cleaning of port 130. Likewise, solenoid cover 140 can be removed for access to plastic coated solenoid body 138, electric solenoid coil 136, and oxidant discharge orifice port 146. To gain access to cell chamber 114, piston 116 can be unscrewed from pump shaft 118 at threads 120.

Alternate embodiments of the device can be ultrasonically welded, glued, or the complete apparatus can incorporate threads. The preferred embodiment comprises threads 106 for attaching the device directly to a drinking bottle such as a Nalgene® bottle, hydration bag, or other water-bearing container. In alternative embodiments, the apparatus can be molded or spin welded directly into a water-bearing container. Possible assembly techniques include ultrasonic welding, spin welding, or other techniques commonly known to those familiar with high volume production techniques.

The above-described embodiments of the present invention are an arrangement in which the cathode is a cylindrical electrode surrounded by cylindrical anode. However, it is obvious to those skilled in the art and from the preceding discussion that the cathode and anode can be flat plates, one within the other, or other physical configuration, and likewise that the anode and cathode can be reversed. Likewise, there may be multiple anodes and/or cathodes utilized in accordance with the present invention. During generation of the oxidant, the anode product and cathode product ions are selectively attracted to the anode and cathode plates.

Although an LED indicator has been described above, other indicators may be utilized in accordance with the present invention. In particular, the indicator can be visually readable, audible and/or vibratory, to indicate completion of electric charge in the cell, low electrolyte, low oxidant, etc.

Other power sources besides batteries may be used in accordance with the present invention, including but not limited to solar panels, fuel cells, external power sources or manually driven electric generators. A generator can convert mechanical energy to electrical energy.

The above-described embodiments of the present invention utilize a timer circuit to fix the amount of charge that passes through the salt solution. An alternative embodiment requires the operator to press the discharge switch for a certain length of time rather than rely on a timer circuit. However, it is obvious to those skilled in the art and from the preceding discussion that any charge integrating device may also be used to determine that the minimum charge has passed through the salt solution.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A cap for a fluid container and decontamination of fluid in the fluid container, said cap comprising:
    an electrolytic cell comprising at least one anode and cathode;
    an electrolyte reservoir comprising an electrolyte therein for generating at least one oxidant to be subsequently added to the fluid;
    a pump;
    a switch;
    a power source activated by said switch for providing a current between said anode and said cathode thereby generating said oxidant from said electrolyte; and
    an opening for release of at least a portion of said generated oxidant into the fluid container.

2. The cap of claim 1 further comprising a timer activated by said switch for providing a predetermined current between said anode and said cathode.

3. The cap of claim 1 comprising a fixed electrolyte conductivity.

4. The cap of claim 1 wherein said reservoir further comprises a prolongation disposed between said anode and said cathode.

5. The cap of claim 1 wherein said electrolyte reservoir comprises a salt reservoir.

6. The cap of claim 5 wherein said salt reservoir comprises a brine reservoir.

7. The cap of claim 1 wherein said electrolyte reservoir is refillable.

8. The cap of claim 1 wherein said cap is disposable.

9. The cap of claim 1 further comprising a piston activated by said switch for drawing electrolyte from said reservoir into said electrolytic cell, and wherein said piston moves in response to gas pressure generated within said cell and discharges said generated oxidant into the fluid container.

10. The cap of claim 1 further comprising a stop button.

11. The cap of claim 1 further comprising a printed circuit board.

12. The cap of claim 1 further comprising a valve for sealing said cell during electrolysis.

13. The cap of claim 1 wherein said electrolyte reservoir further comprises an access and fill port for adding additional electrolyte to said apparatus.

14. The cap of claim 13 further comprising a filter screen.

15. An apparatus for decontamination of a fluid in a fluid container, said apparatus comprising:
    an electrolytic cell for generating at least one oxidant, said oxidant to be subsequently added to the fluid;
    an electrolyte reservoir comprising an electrolyte disposed therein;
    a power source;
    an activator comprising a pump-like device for activating said power source to generate a current and thereby generate an oxidant from said electrolyte; and
    an opening for release of at least a portion of said generated oxidant into the fluid.

16. The apparatus of claim 15 wherein said electrolytic cell comprises a cathode and an anode and wherein said cathode and said anode are concentric.

17. The apparatus of claim 15 wherein said power source comprises at least one source selected from the group consisting of a battery, external power source, solar panel, and manually driven electric generator.

18. The apparatus of claim 15 wherein said power source comprises a fuel cell.

19. The apparatus of claim 15 herein said electrolyte reservoir comprises a salt reservoir.

20. The apparatus of claim 15 wherein said electrolyte reservoir comprises a refillable reservoir.

21. The apparatus of claim 15 wherein said apparatus is disposable.

22. The apparatus of claim 15 wherein said reservoir further comprises a self-sealing check valve.

23. The apparatus of claim 15 further comprising at least one indicator selected from the group consisting of a visually readable indicator, audible indicator and vibratory indicator.

24. The apparatus of claim 15 further comprising an attachment for the fluid container.

25. The apparatus of claim 24 wherein said attachment comprises threads for attaching the apparatus to the fluid container.

26. The apparatus of claim 15 wherein the fluid container is a portable water container.

27. The apparatus of claim 15 wherein said opening for release of said oxidant comprises a check valve.

28. The apparatus of claim 15 wherein said opening releases a predetermined amount of said oxidant into the fluid.

29. The apparatus of claim 15 further comprising a timer wherein said timer is set at a predetermined time to allow a predetermined current in said electrolytic cell.

30. The apparatus of claim 15 wherein said reservoir further comprises a prolongation.

31. The apparatus of claim 15 wherein an oxidant generating reaction produces a gas pressure within said reservoir.

32. The apparatus of claim 31 further comprising at least one opening for release of said gas pressure.

33. The apparatus of claim 15 wherein said oxidant comprises a chlorine containing substance.

34. The apparatus of claim 15 further comprising a piston.

35. The apparatus of claim 34 wherein said piston draws said electrolyte into said electrolytic cell.

36. The apparatus of claim 34 wherein said piston moves in response to gas pressure generated with said cell.

37. The apparatus of claim 34 wherein said piston discharges said generated oxidant into the fluid.

38. The apparatus of claim 15 further comprising an electrically activated valve.

39. The apparatus of claim 15 further comprising a filter screen.

40. An apparatus for decontamination of a fluid in a fluid container, said apparatus comprising:
    an electrolytic cell for generating at least one oxidant, said oxidant to be subsequently added to the fluid;
    said electrolytic cell comprising an anode and a cathode;
    said anode comprising a titanium substrate and an oxide coating;
    an electrolyte reservoir comprising an electrolyte disposed therein;
    a power source;
    an activator for activating said power source to generate a current and thereby generate an oxidant from said electrolyte; and
    an opening for release of at least a portion of said generated oxidant into the fluid.

41. The apparatus of claim 40 wherein said activator comprises a pump-like device.

42. The apparatus of claim 40 wherein said electrolytic cell comprises a cathode and an anode and wherein said cathode and said anode are concentric.

43. The apparatus of claim 40 wherein said power source comprises at least one source selected from the group consisting of a battery, external power source, solar panel, and manually driven electric generator.

44. The apparatus of claim 40 wherein said power source comprises a fuel cell.

45. The apparatus of claim 40 wherein said electrolyte reservoir comprises a salt reservoir.

46. The apparatus of claim 40 wherein said electrolyte reservoir comprises a refillable reservoir.

47. The apparatus of claim 40 wherein said apparatus is disposable.

48. The apparatus of claim 40 wherein said reservoir further comprises a self-sealing check valve.

49. The apparatus of claim 40 further comprising at least one indicator selected from the group consisting of a visually readable indicator, audible indicator and vibratory indicator.

50. The apparatus of claim 40 further comprising an attachment for the fluid container.

51. The apparatus of claim 50 wherein said attachment comprises threads for attaching the apparatus to the fluid container.

52. The apparatus of claim 40 wherein the fluid container is a portable water container.

53. The apparatus of claim 40 wherein said opening for release of said oxidant comprises a check valve.

54. The apparatus of claim 40 wherein said opening releases a predetermined amount of said oxidant into the fluid.

55. The apparatus of claim 40 further comprising a timer wherein said timer is set at a predetermined time to allow a predetermined current in said electrolytic cell.

56. The apparatus of claim 40 wherein said electrolyte reservoir comprises a prolongation.

57. The apparatus of claim 40 wherein an oxidant generating reaction produces a gas pressure within said reservoir.

58. The apparatus of claim 57 further comprising at least one opening for release of said gas pressure.

59. The apparatus of claim 40 wherein said oxidant comprises a chlorine containing substance.

60. The apparatus of claim 40 further comprising a piston.

61. The apparatus of claim 60 wherein said piston draws said electrolyte into said electrolytic cell.

62. The apparatus of claim 60 wherein said piston moves in response to gas pressure generated with said cell.

63. The apparatus of claim 60 wherein said piston discharges said generated oxidant into the fluid.

64. The apparatus of claim 40 further comprising an electrically activated valve.

65. The apparatus of claim 40 further comprising a filter screen.

66. An apparatus far decontamination of a fluid in a fluid container, said apparatus comprising:
    an electrolytic cell for generating at least one oxidant, said oxidant to be subsequently added to the fluid;
    an electrolyte reservoir comprising an electrolyte disposed therein and a storage compartment;
    a power source;
    an activator for activating said power source to generate a current and thereby generate an oxidant from said electrolyte; and
    an opening for release of at least a portion of said generated oxidant into the fluid.

67. The apparatus of claim 66 wherein said activator comprises a pump-like device.

68. The apparatus of claim 66 wherein said electrolytic cell comprises a cathode and an anode and wherein said cathode and said anode are concentric.

69. The apparatus of claim 66 wherein said power source comprises at least one source selected from the group consisting of a battery, external power source, solar panel, and manually driven electric generator.

70. The apparatus of claim 66 wherein said power sources comprises a fuel cell.

71. The apparatus of claim 66 wherein said electrolyte reservoir comprises a salt reservoir.

72. The apparatus of claim 66 wherein said electrolyte reservoir comprises a refillable reservoir.

73. The apparatus of claim 66 wherein said apparatus is disposable.

74. The apparatus of claim 66 wherein said storage compartment further comprises a self-sealing check valve.

75. The apparatus of claim 66 further comprising at least one indicator selected from the group consisting of a visually readable indicator, audible indicator and vibratory indicator.

76. The apparatus of claim 66 further comprising an attachment for the fluid container.

77. The apparatus of claim 76 wherein said attachment comprises threads for attaching the apparatus to the fluid container.

78. The apparatus of claim 66 wherein the fluid container is a portable water container.

79. The apparatus of claim 66 wherein said opening for release of said oxidant comprises a check valve.

80. The apparatus of claim 66 wherein said opening releases a predetermined amount of said oxidant into the fluid.

81. The apparatus of claim 66 further comprising a timer wherein said timer is set at a predetermined time to allow a predetermined current in said electrolytic cell.

82. The apparatus of claim 66 wherein said electrolyte reservoir comprises a prolongation.

83. The apparatus of claim 66 wherein an oxidant generating reaction produces a gas pressure within said reservoir.

84. The apparatus of claim 83 further comprising at least one opening for release of said gas pressure.

85. The apparatus of claim 66 wherein said oxidant comprises a chlorine containing substance.

86. The apparatus of claim 66 further comprising a piston.

87. The apparatus of claim 86 wherein said piston draws said electrolyte into said electrolytic cell.

88. The apparatus of claim 86 wherein said piston moves in response to gas pressure generated with said cell.

89. The apparatus of claim 86 wherein said piston discharges said generated oxidant into the fluid.

90. The apparatus of claim 66 further comprising an electrically activated valve.

91. The apparatus of claim 66 further comprising a filter screen.

92. An apparatus for decontamination of a fluid in a fluid container, said apparatus comprising:
    an electrolytic cell for generating at least one oxidant, said oxidant to be subsequently added to the fluid;
    an electrolyte reservoir comprising an electrolyte disposed therein;
    a power source;
    an activator for activating said power source to generate a current and thereby generate an oxidant from said electrolyte;
    an opening for release of at least a portion of said generated oxidant into the fluid; and
    an attachment for the fluid container.

93. The apparatus of claim 92 wherein said activator comprises a pump-like device.

94. The apparatus of claim 92 wherein said electrolytic cell comprises a cathode and an anode and wherein said cathode and said anode are concentric.

95. The apparatus of claim 92 wherein said power source comprises at least one source selected from the group consisting of a battery, external power source, solar panel, and manually driven electric generator.

96. The apparatus of claim 92 wherein said power source comprises a fuel cell.

97. The apparatus of claim 92 wherein said electrolyte reservoir comprises a salt reservoir.

98. The apparatus of claim 92 wherein said electrolyte reservoir comprises a refillable reservoir.

99. The apparatus of claim 92 wherein said apparatus is disposable.

100. The apparatus of claim 92 wherein said reservoir further comprises a self-sealing check valve.

101. The apparatus of claim 92 further comprising at least one indicator selected from the group consisting of a visually readable indicator, audible indicator and vibratory indicator.

102. The apparatus of claim 92 wherein said attachment comprises threads for attaching the apparatus to the fluid container.

103. The apparatus of claim 92 wherein the fluid container is a portable water container.

104. The apparatus of claim 92 wherein said opening for release of said oxidant comprises a check valve.

105. The apparatus of claim 92 wherein said opening releases a predetermined amount of said oxidant into the fluid.

106. The apparatus of claim 92 further comprising a timer wherein said timer is set at a predetermined time to allow a predetermined current in said electrolytic cell.

107. The apparatus of claim 92 wherein said electrolyte reservoir comprises a prolongation.

108. The apparatus of claim 92 wherein an oxidant generating reaction produces a gas pressure within said reservoir.

109. The apparatus of claim 108 further comprising at least one opening for release of said gas pressure.

110. The apparatus of claim 92 wherein said oxidant comprises a chlorine containing substance.

111. The apparatus of claim 92 further comprising a piston.

112. The apparatus of claim 111 wherein said piston draws said electrolyte into said electrolytic cell.

113. The apparatus of claim 111 wherein said piston moves in response to gas pressure generated with said cell.

114. The apparatus of claim 111 wherein said piston discharges said generated oxidant into the fluid.

115. The apparatus of claim 92 further comprising a valve for sealing said cell during electrolysis.

116. The apparatus of claim 115 further comprising an electrically activated valve.

117. The apparatus of claim 92 further comprising a filter screen.

118. An apparatus for decontamination of a fluid in a fluid container, said apparatus comprising:
- an electrolytic cell for generating at least one oxidant, said oxidant to be subsequently added to the fluid;
- an electrolyte reservoir comprising an electrolyte disposed therein;
- a power source;
- an activator for activating said power source to generate a current and thereby generate an oxidant from said electrolyte; and
- an opening for release of at least a portion of said generated oxidant into the fluid, said opening comprising a check valve.

119. The apparatus of claim 118 wherein said activator comprises a pump-like device.

120. The apparatus of claim 118 wherein said electrolytic cell comprises a cathode and an anode and wherein said cathode and said anode are concentric.

121. The apparatus of claim 118 wherein said power source comprises at least one source selected from the group consisting of a battery, external power source, solar panel, and manually driven electric generator.

122. The apparatus of claim 118 wherein said power source comprises a fuel cell.

123. The apparatus of claim 118 wherein said electrolyte reservoir comprises a salt reservoir.

124. The apparatus of claim 118 wherein said electrolyte reservoir comprises a refillable reservoir.

125. The apparatus of claim 118 wherein said apparatus is disposable.

126. The apparatus of claim 118 wherein said reservoir further comprising a self-sealing check valve.

127. The apparatus of claim 118 further comprising at least one indicator selected from the group consisting of a visually readable indicator, audible indicator and vibratory indicator.

128. The apparatus of claim 118 further comprising an attachment for the fluid container.

129. The apparatus of claim 118 wherein said attachment comprises threads for attaching the apparatus to the fluid container.

130. The apparatus of claim 118 wherein the fluid container is a portable water container.

131. The apparatus of claim 118 wherein said opening releases a predetermined amount of said oxidant into the fluid.

132. The apparatus of claim 118 further comprising a timer wherein said timer is set at a predetermined time to allow a predetermined current in said electrolytic cell.

133. The apparatus of claim 118 wherein said electrolyte reservoir comprises a prolongation.

134. The apparatus of claim 118 wherein an oxidant generating reaction produces a gas pressure within said reservoir.

135. The apparatus of claim 134 further comprising at least one opening for release of said gas pressure.

136. The apparatus of claim 118 wherein said oxidant comprises a chlorine containing substance.

137. The apparatus of claim 118 further comprising a piston.

138. The apparatus of claim 137 wherein said piston draws said electrolyte into said electrolytic cell.

139. The apparatus of claim 137 wherein said piston moves in response to gas pressure generated with said cell.

140. The apparatus of claim 137 wherein said piston discharges said generated oxidant into the fluid.

141. The apparatus of claim 137 wherein said valve comprises an electrically activated valve.

142. The apparatus of claim 118 further comprising a filter screen.

143. An apparatus for decontamination of a fluid in a fluid container, said apparatus comprising:
- an electrolytic cell for generating at least one oxidant, said oxidant to be subsequently added to the fluid;
- an electrolyte reservoir comprising an electrolyte disposed therein;
- a power source;

an activator for activating said power source to generate a current and thereby generate an oxidant from said electrolyte; and an opening for release of at least a portion of said generated oxidant into the fluid, wherein said opening releases a predetermined amount of said oxidant into the fluid.

144. The apparatus of claim 143 wherein said activator comprises a pump-like device.

145. The apparatus of claim 143 wherein said electrolytic cell comprises a cathode and an anode and wherein said cathode and said anode are concentric.

146. The apparatus of claim 143 wherein said power source comprises at least one source selected from the group consisting of a battery, external power source, solar panel, and manually driven electric generator.

147. The apparatus of claim 143 wherein said power source comprises a fuel cell.

148. The apparatus of claim 143 wherein said electrolyte reservoir comprises a salt reservoir.

149. The apparatus of claim 143 wherein said electrolyte reservoir comprises a refillable reservoir.

150. The apparatus of claim 143 wherein said apparatus is disposable.

151. The apparatus of claim 143 wherein said reservoir further comprises a self-sealing check valve.

152. The apparatus of claim 143 further comprising at least one indicator selected from the group consisting of a Visually readable indicator, audible indicator and vibratory indicator.

153. The apparatus of claim 143 further comprising an attachment for the fluid container.

154. The apparatus of claim 153 wherein said attachment comprises threads for attaching the apparatus to the fluid container.

155. The apparatus of claim 143 wherein the fluid container is a portable water container.

156. The apparatus of claim 143 wherein said opening for release of said oxidant comprises a check valve.

157. The apparatus of claim 143 further comprising a timer wherein said timer is set at a predetermined time to allow a predetermined current in said electrolytic cell.

158. The apparatus of claim 143 wherein said electrolyte reservoir comprises a prolongation.

159. The apparatus of claim 143 wherein an oxidant generating reaction produces a gas pressure within said reservoir.

160. The apparatus of claim 159 further comprising at least one opening for release of said gas pressure.

161. The apparatus of claim 143 wherein said oxidant comprises a chlorine containing substance.

162. The apparatus of claim 143 further comprising a piston.

163. The apparatus of claim 143 wherein said piston draws said electrolyte into said electrolytic cell.

164. The apparatus of claim 143 wherein said piston moves in response to gas pressure generated with said cell.

165. The apparatus of claim 143 wherein said piston discharges said generated oxidant into the fluid.

166. The apparatus of claim 143 further comprising an electrically activated valve.

167. The apparatus of claim 143 further comprising a filter screen.

168. An apparatus for decontamination of a fluid in a fluid container, said apparatus comprising:

an electrolytic cell for generating at least one oxidant, said oxidant to be subsequently added to the fluid;

an electrolyte reservoir comprising an electrolyte disposed therein; a power source;

a contact to activate a switch for activating said power source to generate a current and thereby generate an oxidant from said electrolyte; and an opening for release of at least a portion of said generated oxidant into the fluid.

169. The apparatus of claim 168 wherein said activator comprises a pump-like device.

170. The apparatus of claim 168 wherein said electrolytic cell comprises a cathode and an anode and wherein said cathode and said anode are concentric.

171. The apparatus of claim 168 wherein said power source comprises at least one source selected from the group consisting of a battery, external power source, solar panel, and manually driven electric generator.

172. The apparatus of claim 168 wherein said power source comprises a fuel cell.

173. The apparatus of claim 168 wherein said electrolyte reservoir comprises a salt reservoir.

174. The apparatus of claim 168 wherein said electrolyte reservoir comprises a refillable reservoir.

175. The apparatus of claim 168 wherein said apparatus is disposable.

176. The apparatus of claim 168 wherein said reservoir further comprises a self-sealing check valve.

177. The apparatus of claim 168 further comprising at least one indicator selected from the group consisting of a visually readable indicator, audible indicator and vibratory indicator.

178. The apparatus of claim 168 further comprising an attachment for the fluid container.

179. The apparatus of claim 178 wherein said attachment comprises threads for attaching the apparatus to the fluid container.

180. The apparatus of claim 168 wherein the fluid container is a portable water container.

181. The apparatus of claim 168 wherein said opening for release of said oxidant comprises a check valve.

182. The apparatus of claim 168 wherein said opening releases a predetermined amount of said oxidant into the fluid.

183. The apparatus of claim 168 further comprising a timer wherein said timer is set at a predetermined time to arrow a predetermined current in said electrolytic cell.

184. The apparatus of claim 168 wherein said electrolyte reservoir comprises a prolongation.

185. The apparatus of claim 168 wherein an oxidant generating reaction produces a gas pressure within said reservoir.

186. The apparatus of claim 185 further comprising at least one opening for release of said gas pressure.

187. The apparatus of claim 168 wherein said oxidant comprises a chlorine containing substance.

188. The apparatus of claim 168 further comprising a piston.

189. The apparatus of claim 188 wherein said piston draws said electrolyte into said electrolytic cell.

190. The apparatus of claim 188 wherein said piston moves in response to gas pressure generated with said cell.

191. The apparatus of claim 188 wherein said piston discharges said generated oxidant into the fluid.

192. The apparatus of claim 168 further comprising an electrically activated valve.

193. The apparatus of claim 168 further comprising a filter screen.

194. An apparatus for decontamination of a fluid in a fluid container, said apparatus comprising:
  an electrolytic cell for generating at least one oxidant, said oxidant to be subsequently added to the fluid;
  an electrolyte reservoir comprising an electrolyte disposed therein; a power source;
  an activator for activating said power source to generate a current and thereby generate an oxidant from said electrolyte;
  a timer; and
  an opening for release of at least a portion of said generated oxidant into the fluid.

195. The apparatus of claim 194 wherein said activator comprises a pump-like device.

196. The apparatus of claim 194 wherein electrolytic cell comprises a cathode and an anode and wherein said cathode and said anode are concentric.

197. The apparatus of claim 194 wherein said power source comprises at least one source selected from the group consisting of a battery, external power source, solar panel, and manually driven electric generator.

198. The apparatus of claim 194 wherein said power source comprises a fuel cell.

199. The apparatus of claim 194 wherein said electrolyte reservoir comprises a salt reservoir.

200. The apparatus of claim 194 wherein said electrolyte reservoir comprises a refillable reservoir.

201. The apparatus of claim 194 wherein said apparatus is disposable.

202. The apparatus of claim 194 wherein said reservoir further comprises a self-sealing check valve.

203. The apparatus of claim 194 further comprising at least one indicator selected from the group consisting of a visually readable indicator, audible indicator and vibratory indicator.

204. The apparatus of claim 194 further comprising an attachment for the fluid container.

205. The apparatus of claim 204 wherein said attachment comprises threads for attaching the apparatus to the fluid container.

206. The apparatus of claim 194 wherein the fluid container is a portable water container.

207. The apparatus at claim 194 wherein said opening for release of said oxidant comprises a check valve.

208. The apparatus of claim 194 wherein said opening releases a predetermined amount of said oxidant into the fluid.

209. The apparatus of claim 194 wherein said timer is set at a predetermined time to allow a predetermined current in said electrolytic cell.

210. The apparatus of claim 194 wherein said electrolyte reservoir comprises a prolongation.

211. The apparatus of claim 194 wherein an oxidant generating reaction produces a gas pressure within said reservoir.

212. The apparatus of claim 211 further comprising at least one opening for release of said gas pressure.

213. The apparatus of claim 194 wherein said oxidant comprises a chlorine containing substance.

214. The apparatus of claim 194 further comprising a piston.

215. The apparatus of claim 214 wherein said piston draws said electrolyte into said electrolytic cell.

216. The apparatus of claim 214 wherein said piston moves in response to gas pressure generated with said cell.

217. The apparatus of claim 214 wherein said piston discharges said generated oxidant into the fluid.

218. The apparatus of claim 194 further comprising an electrically activated valve.

219. The apparatus of claim 194 further comprising a filter screen.

220. An apparatus for decontamination of a fluid in a fluid container, said apparatus comprising:
  an electrolytic cell for generating at least one oxidant, said oxidant to be subsequently added to the fluid;
  an electrolyte reservoir comprising an electrolyte disposed therein wherein an oxidant generating reaction produces a gas pressure within said reservoir; a power source;
  an activator for activating said power source to generate a current and thereby generate an oxidant from said electrolyte; and
  an opening for release of at least a portion of said generated oxidant into the fluid.

221. The apparatus of claim 220 wherein said activator comprises a pump-like device.

222. The apparatus of claim 220 wherein said electrolytic cell comprises a cathode and an anode and wherein said cathode and said anode are concentric.

223. The apparatus of claim 220 wherein said power source comprises at least one source selected from the group consisting of a battery, external power source, solar panel, and manually driven electric generator.

224. The apparatus of claim 220 wherein said power source comprise a fuel cell.

225. The apparatus of claim 220 wherein said electrolyte reservoir comprises a salt reservoir.

226. The apparatus of claim 220 wherein said electrolyte reservoir comprises a refillable reservoir.

227. The apparatus of claim 220 wherein said apparatus is disposable.

228. The apparatus of claim 220 wherein said reservoir further comprises a self-sealing check valve.

229. The apparatus of claim 220 further comprising at least one indicator selected from the group consisting of a visually readable indicator, audible indicator and vibratory indicator.

230. The apparatus of claim 220 further comprising an attachment for the fluid container.

231. The apparatus of claim 230 wherein said attachment comprises threads for attaching the apparatus to the fluid container.

232. The apparatus of claim 220 wherein the fluid container is a portable water container.

233. The apparatus of claim 220 wherein said opening for release of said oxidant comprises a check valve.

234. The apparatus of claim 220 wherein said opening releases a predetermined amount of said oxidant into the fluid.

235. The apparatus of claim 220 further comprising a timer wherein said timer is set at a predetermined time to allow a predetermined current in said electrolytic cell.

236. The apparatus of claim 220 wherein said electrolyte reservoir comprises a prolongation.

237. The apparatus of claim 220 further comprising at least one opening for release of said gas pressure.

238. The apparatus of claim 220 wherein said oxidant comprises a chlorine containing substance.

239. The apparatus of claim 220 further comprising a piston.

240. The apparatus of claim 239 wherein said piston draws said electrolyte into said electrolytic cell.

241. The apparatus of claim 239 wherein said piston moves in response to gas pressure generated with said cell.

242. The apparatus of claim 239 wherein said piston discharges said generated oxidant into the fluid.

243. The apparatus of claim 220 further comprising an electrically activated valve.

244. The apparatus of claim 220 further comprising a filter screen.

245. An apparatus for decontamination of a fluid in a fluid container, said apparatus comprising:
- an electrolytic cell for generating at least one oxidant, said oxidant to be subsequently added to the fluid;
- an electrolyte reservoir comprising an electrolyte disposed therein;
- a power source;
- an activator for activating said power source to generate a current and thereby generate an oxidant from said electrolyte;
- a piston; and
- an opening for release of at least a portion of said generated oxidant into the fluid.

246. The apparatus of claim 245 wherein said activator comprises a pump-like device.

247. The apparatus of claim 245 wherein said electrolytic cell comprises a cathode and an anode and wherein said cathode and said anode are concentric.

248. The apparatus of claim 245 wherein said power source comprises at least one source selected from the group consisting of a battery, external power source, solar panel, and manually driven electric generator.

249. The apparatus of claim 245 wherein said power source comprises a fuel cell.

250. The apparatus of claim 245 wherein said electrolyte reservoir comprises a salt reservoir.

251. The apparatus of claim 245 wherein said electrolyte reservoir comprises a refillable reservoir.

252. The apparatus of claim 245 wherein said apparatus is disposable.

253. The apparatus of claim 245 wherein said reservoir further comprises a self-sealing check valve.

254. The apparatus of claim 245 further comprising at least one indicator selected from the group consisting of a visually readable indicator, audible indicator and vibratory indicator.

255. The apparatus of claim 245 further comprising an attachment for the fluid container.

256. The apparatus of claim 255 wherein said attachment comprises threads for attaching the apparatus to the fluid container.

257. The apparatus of claim 245 wherein the fluid container is a portable water container.

258. The apparatus of claim 245 wherein said opening for release of said oxidant comprises a check valve.

259. The apparatus of claim 245 wherein said opening releases a predetermined amount of said oxidant into the fluid.

260. The apparatus of claim 245 further comprising a timer wherein said timer is set at a predetermined time to allow a predetermined current in said electrolytic cell.

261. The apparatus of claim 245 wherein said electrolyte reservoir comprises a prolongation.

262. The apparatus of claim 245 wherein an oxidant generating reaction produces a gas pressure within said reservoir.

263. The apparatus of claim 262 further comprising at least one opening for release of said gas pressure.

264. The apparatus of claim 245 wherein said oxidant comprises a chlorine containing substance.

265. The apparatus of claim 245 wherein said piston draws said electrolyte into said electrolytic cell.

266. The apparatus of claim 245 wherein said piston moves in response to gas pressure generated with said cell.

267. The apparatus of claim 245 wherein said piston discharges said generated oxidant into the fluid.

268. The apparatus of claim 245 wherein said valve comprises an electrically activated valve.

269. The apparatus of claim 245 further comprising a filter screen.

270. An apparatus for decontamination of a fluid in a fluid container, said apparatus comprising:
- an electrolytic cell for generating at least one oxidant, said oxidant to be subsequently added to the fluid;
- an electrolyte reservoir comprising an electrolyte disposed therein;
- a power source;
- an activator for activating said power source to generate a current and thereby generate an oxidant from said electrolyte;
- a stop button; and
- an opening for release of at least a portion of said generated oxidant into the fluid.

271. The apparatus of claim 270 wherein said activator comprises a pump-like device.

272. The apparatus of claim 270 wherein said electrolytic cell comprises a cathode and an anode and wherein said cathode and said anode are concentric.

273. The apparatus of claim 270 wherein said power source comprises at least one source selected from the group consisting of a battery, external power source, solar panel, and manually driven electric generator.

274. The apparatus of claim 270 wherein said power source comprises a fuel cell.

275. The apparatus of claim 270 wherein said electrolyte reservoir comprises a salt reservoir.

276. The apparatus of claim 270 wherein said electrolyte reservoir comprises a refillable reservoir.

277. The apparatus of claim 270 wherein said apparatus is disposable.

278. The apparatus of claim 270 wherein said reservoir further comprises a self-sealing check valve.

279. The apparatus of claim 270 further comprising at least one indicator selected from the group consisting of a visually readable indicator, audible indicator and vibratory indicator.

280. The apparatus of claim 270 further comprising an attachment tar the fluid container.

281. The apparatus of claim 270 wherein said attachment comprises threads for attaching the apparatus to the fluid container.

282. The apparatus of claim 270 wherein the fluid container is a portable water container.

283. The apparatus of claim 270 wherein said opening for release of said oxidant comprises a check valve.

284. The apparatus of claim 270 wherein said opening releases a predetermined amount of said oxidant into the fluid.

285. The apparatus of claim 270 further comprising a timer wherein said timer is set at a predetermined time to allow a predetermined current in said electrolytic cell.

286. The apparatus of claim 270 wherein said electrolyte reservoir comprises a prolongation.

287. The apparatus of claim 270 wherein an oxidant generating reaction produces a gas pressure within said reservoir.

288. The apparatus of claim 287 further comprising at least one opening for release of said gas pressure.

289. The apparatus of claim 270 wherein said oxidant comprises a chlorine containing substance.

290. The apparatus of claim 270 further comprising a piston.

291. The apparatus of claim 290 wherein said piston draws said electrolyte into said electrolytic cell.

292. The apparatus of claim 290 wherein said piston moves in response to gas pressure generated with said cell.

293. The apparatus of claim 290 wherein said piston discharges said generated oxidant into the fluid.

294. The apparatus of claim 270 further comprising an electrically activated valve.

295. The apparatus of claim 270 further comprising a filter screen.

296. An apparatus for decontamination of a fluid in a fluid container, said apparatus comprising:
- an electrolytic cell for generating at least one oxidant, said oxidant to be subsequently added to the fluid;
- an electrolyte reservoir comprising an electrolyte disposed therein;
- a power source;
- a printed circuit board;
- an activator for activating said power source to generate a current and thereby generate an oxidant from said electrolyte; and
- an opening for release of at least a portion of said generated oxidant into the fluid.

297. The apparatus of claim 296 wherein said activator comprises a pump-like device.

298. The apparatus of claim 296 wherein said electrolytic cell comprises a cathode and an anode and wherein said cathode and said anode are concentric.

299. The apparatus of claim 296 wherein said power source comprises at least one source selected from the group consisting of a battery, external power source, solar panel, and manually driven electric generator.

300. The apparatus of claim 296 wherein said power source comprises a fuel cell.

301. The apparatus of claim 296 wherein said electrolyte reservoir comprises a salt reservoir.

302. The apparatus of claim 296 wherein said electrolyte reservoir comprises a refillable reservoir.

303. The apparatus of claim 296 wherein said apparatus is disposable.

304. The apparatus of claim 296 wherein said reservoir further comprises a self-sealing check valve.

305. The apparatus of claim 296 further comprising at least one indicator selected from the group consisting of a visually readable indicator, audible indicator and vibratory indicator.

306. The apparatus of claim 296 further comprising an attachment for the fluid container.

307. The apparatus of claim 306 wherein said attachment comprises threads for attaching the apparatus to the fluid container.

308. The apparatus of claim 296 wherein the fluid container is a portable water container.

309. The apparatus of claim 296 wherein said opening for release of said oxidant comprises a check valve.

310. The apparatus of claim 296 wherein said opening releases a predetermined amount of said oxidant into the fluid.

311. The apparatus of claim 296 further comprising a timer wherein said timer is set at a predetermined time to allow a predetermined current in said electrolytic cell.

312. The apparatus of claim 296 wherein said electrolyte reservoir comprises a prolongation.

313. The apparatus of claim 296 wherein an oxidant generating reaction produces a gas pressure within said reservoir.

314. The apparatus of claim 313 further comprising at least one opening for release of said gas pressure.

315. The apparatus of claim 296 wherein said oxidant comprises a chlorine containing substance.

316. The apparatus of claim 296 further comprising a piston.

317. The apparatus of claim 316 wherein said piston draws said electrolyte into said electrolytic cell.

318. The apparatus of claim 316 wherein said piston moves in response to gas pressure generated with said cell.

319. The apparatus of claim 316 wherein said piston discharges said generated oxidant into the fluid.

320. The apparatus of claim 296 further comprising an electrically activated valve.

321. The apparatus of claim 296 further comprising a filter screen.

322. An apparatus for decontamination of a fluid in a fluid container, said apparatus comprising:
- an electrolytic cell for generating at least one oxidant, said oxidant to be subsequently added to the fluid;
- an electrolyte reservoir comprising an electrolyte disposed therein;
- a power source;
- an activator for activating said power source to generate a current and thereby generate an oxidant from said electrolyte;
- a valve for sealing said cell during electrolysis; and an opening for release of at least a portion of said generated oxidant into the fluid.

323. The apparatus of claim 322 wherein said activator comprises a pump-like device.

324. The apparatus of claim 322 wherein said electrolytic cell comprises a cathode and an anode and wherein said cathode and said anode are concentric.

325. The apparatus of claim 322 wherein said power source comprises at least one source selected from the group consisting of a battery, external power source, solar panel, and manually driven electric generator.

326. The apparatus of claim 322 wherein said power source comprises a fuel cell.

327. The apparatus of claim 322 wherein said electrolyte reservoir comprises a salt reservoir.

328. The apparatus of claim 322 wherein said electrolyte reservoir comprises a refillable reservoir.

329. The apparatus of claim 322 wherein said apparatus is disposable.

330. The apparatus of claim 322 wherein said reservoir further comprises a self-sealing check valve.

331. The apparatus of claim 322 further comprising at least one indicator selected from the group consisting of a visually readable indicator, audible indicator and vibratory indicator.

332. The apparatus of claim 322 further comprising an attachment for the fluid container.

333. The apparatus of claim 332 wherein said attachment comprises threads for attaching the apparatus to the fluid container.

334. The apparatus of claim 322 wherein the fluid container is a portable water container.

335. The apparatus of claim 322 wherein said opening for release of said oxidant comprises a check valve.

336. The apparatus of claim 322 wherein said opening releases a predetermined amount of said oxidant into the fluid.

337. The apparatus of claim 322 further comprising a timer wherein said timer is set at a predetermined time to allow a predetermined current in said electrolytic cell.

338. The apparatus of claim 322 wherein said electrolyte reservoir comprises a prolongation.

339. The apparatus of claim 322 wherein an oxidant generating reaction produces a gas pressure within said reservoir.

340. The apparatus of claim 339 further comprising at least one opening for release of said gas pressure.

341. The apparatus of claim 322 wherein said oxidant comprises a chlorine containing substance.

342. The apparatus of claim 322 further comprising a piston.

343. The apparatus of claim 342 wherein said piston draws said electrolyte into said electrolytic cell.

344. The apparatus of claim 342 wherein said piston moves in response to gas pressure generated with said cell.

345. The apparatus of claim 342 wherein said piston discharges said generated oxidant into the fluid.

346. The apparatus of claim 322 further comprising an electrically activated valve.

347. The apparatus of claim 322 further comprising a filter screen.

348. An apparatus for decontamination of a fluid in a fluid container, said apparatus comprising:

an electrolytic cell for generating at least one oxidant, said oxidant to be subsequently added to the fluid;

an electrolyte reservoir comprising an electrolyte disposed therein and an access and fill port for adding additional electrolyte to said apparatus;

a power source;

an activator for activating said power source to generate a current and thereby generate an oxidant from said electrolyte; and an opening for release of at least a portion of said generated oxidant into the fluid.

349. The apparatus of claim 348 wherein said activator comprises a pump-like device.

350. The apparatus of claim 348 wherein said electrolytic cell comprises a cathode and an anode and wherein said cathode and said anode are concentric.

351. The apparatus of claim 348 wherein said power source comprises at least one source selected from the group consisting of a battery, external power source, solar panel, and manually driven electric generator.

352. The apparatus of claim 348 wherein said power source comprises a fuel cell.

353. The apparatus of claim 348 wherein said electrolyte reservoir comprises a salt reservoir.

354. The apparatus of claim 348 wherein said electrolyte reservoir comprises a refillable reservoir.

355. The apparatus of claim 348 wherein said apparatus is disposable.

356. The apparatus of claim 348 wherein said reservoir further comprises a self-sealing check valve.

357. The apparatus of claim 348 further comprising at least one indicator selected from the group consisting of a visually readable indicator, audible indicator and vibratory indicator.

358. The apparatus of claim 348 further comprising an attachment for the fluid container.

359. The apparatus of claim 358 wherein said attachment comprises threads for attaching the apparatus to the fluid container.

360. The apparatus of claim 348 wherein the fluid container is a portable water container.

361. The apparatus of claim 348 wherein said opening for release of said oxidant comprises a check valve.

362. The apparatus of claim 348 wherein said opening releases a predetermined amount of said oxidant into the fluid.

363. The apparatus of claim 348 further comprising a timer wherein said timer is set at a predetermined time to allow a predetermined current in said electrolytic cell.

364. The apparatus of claim 348 wherein said electrolyte reservoir comprises a prolongation.

365. The apparatus of claim 348 wherein an oxidant generating reaction produces a gas pressure within said reservoir.

366. The apparatus of claim 365 further comprising at least one opening for release of said gas pressure.

367. The apparatus of claim 348 wherein said oxidant comprises a chlorine containing substance.

368. The apparatus of claim 348 further comprising a piston.

369. The apparatus of claim 368 wherein said piston draws said electrolyte into said electrolytic cell.

370. The apparatus of claim 368 wherein said piston moves in response to gas pressure generated with said cell.

371. The apparatus of claim 368 wherein said piston discharges said generated oxidant into the fluid.

372. The apparatus of claim 348 further comprising an electrically activated valve.

373. The apparatus of claim 348 further comprising a filter screen.

* * * * *